United States Patent
Ireland

(10) Patent No.: US 10,210,216 B2
(45) Date of Patent: Feb. 19, 2019

(54) DYNAMIC ATTRIBUTES FOR MOBILE BUSINESS OBJECTS

(75) Inventor: Evan Peter Ireland, Wellington (NZ)

(73) Assignee: SYBASE, INC., Dublin, CA (US)

( * ) Notice: Subject to any disclaimer, the term of this patent is extended or adjusted under 35 U.S.C. 154(b) by 729 days.

(21) Appl. No.: 12/641,775

(22) Filed: Dec. 18, 2009

(65) Prior Publication Data

US 2011/0153836 A1 Jun. 23, 2011

(51) Int. Cl.
G06F 15/16 (2006.01)
G06F 17/30 (2006.01)

(52) U.S. Cl.
CPC .................. *G06F 17/30525* (2013.01)

(58) Field of Classification Search
CPC .............. G06F 11/201; G06F 11/2089; G06F 11/2094; G06F 17/30398; G06F 17/30401; G06F 17/30404; G06F 17/30424; G06F 17/30554; G06F 17/30575; G06F 17/30991; G06F 17/30997; H04L 41/065; H04L 67/1095; H04L 69/321; H04L 69/322
USPC ................ 709/227, 228; 455/422, 552, 450; 370/328
See application file for complete search history.

(56) References Cited

U.S. PATENT DOCUMENTS

| | | | |
|---|---|---|---|
| 7,464,067 B2* | 12/2008 | Chestnut et al. | |
| 7,966,408 B2* | 6/2011 | Schramm et al. | 709/228 |
| 8,090,380 B2* | 1/2012 | Islam et al. | 455/450 |
| 8,199,001 B2* | 6/2012 | Verbil | 340/539.13 |
| 2002/0039367 A1* | 4/2002 | Seppala et al. | 370/401 |
| 2002/0128035 A1* | 9/2002 | Jokinen et al. | 455/552 |
| 2003/0149557 A1* | 8/2003 | Cox | H04M 3/42229 704/2 |
| 2004/0054800 A1* | 3/2004 | Shah et al. | 709/231 |
| 2004/0171375 A1* | 9/2004 | Chow-Toun | 455/418 |
| 2004/0192258 A1* | 9/2004 | Atkin | H04L 12/1845 455/412.1 |
| 2004/0267762 A1* | 12/2004 | Tunning | G06F 17/30522 |
| 2005/0117541 A1* | 6/2005 | Negus | 370/329 |
| 2006/0160533 A1* | 7/2006 | Chou et al. | 455/422.1 |
| 2006/0179036 A1* | 8/2006 | Broker | 707/3 |
| 2007/0038617 A1* | 2/2007 | Feinberg | G06F 9/4448 |
| 2007/0111698 A1* | 5/2007 | Mysore | H04L 12/5695 455/338 |

(Continued)

*Primary Examiner* — Thuong Nguyen
(74) *Attorney, Agent, or Firm* — Sterne, Kessler, Goldstein & Fox P.L.L.C.

(57) ABSTRACT

Embodiments of the present invention relate to system, method, computer program product embodiments and combinations and sub-combinations thereof for generating dynamic attribute elements and dynamic attributes for MBOs. An embodiment includes generating dynamic attribute elements for MBO metadata in a manner that enables a mobile application to directly access and modify dynamic attributes included within the dynamic attribute elements. In an embodiment, dynamic attributes are included within the dynamic attribute elements arbitrarily to synchronization sessions of a server and a mobile application. The embodiment also allows the mobile application to set a value associated with a dynamic attribute. Another embodiment includes embedding a dynamic attributes entity in generated client code and downloading dynamic MBO attributes and associated metadata when the client synchronizes with the server.

18 Claims, 8 Drawing Sheets

(56) References Cited

U.S. PATENT DOCUMENTS

| | | |
|---|---|---|
| 2007/0130290 A1* | 6/2007 | van der Winkel .......................... H04L 12/2856 709/219 |
| 2007/0162274 A1* | 7/2007 | Ruiz et al. ........................ 704/9 |
| 2007/0180385 A1* | 8/2007 | Somasundaram et al. ... 715/738 |
| 2007/0247367 A1* | 10/2007 | Anjum .................. H04W 64/00 342/464 |
| 2008/0311950 A1* | 12/2008 | Smith ........................ 455/552.1 |
| 2009/0177462 A1* | 7/2009 | Alfven .................. G06F 17/289 704/3 |
| 2009/0177733 A1* | 7/2009 | Talker .................. G06F 9/4448 709/203 |
| 2010/0030783 A1 | 2/2010 | Ho et al. |
| 2010/0088334 A1* | 4/2010 | Wasserman et al. ......... 707/769 |
| 2010/0103870 A1* | 4/2010 | Garcia-Luna-Aceves et al. ......... 370/328 |
| 2010/0185434 A1* | 7/2010 | Burvall ................ G06F 17/289 704/3 |
| 2010/0253281 A1* | 10/2010 | Li ................................ 320/108 |
| 2010/0325556 A1* | 12/2010 | Zhu ....................... H04L 67/306 715/747 |
| 2011/0059748 A1* | 3/2011 | Taylor .................... H04W 4/02 455/456.1 |
| 2012/0143925 A1* | 6/2012 | Surasinghe ................... 707/805 |
| 2013/0159342 A1* | 6/2013 | Cragun et al. ................ 707/769 |

* cited by examiner

DYNAMIC ATTRIBUTES FOR MOBILE BUSINESS OBJECTS

BACKGROUND

Field

The present invention relates to mobile business objects (MBOs), and particularly towards MBO attributes.

Background Art

A mobile business object (MBO) represents one or more subsets of data contained in a server or a database associated with a server. A MBO can be expressed using metadata, which is interpreted by a mobile application to facilitate access of data from a server.

MBO metadata includes attributes and parameters which can be mapped to enterprise information systems (EIS) columns, properties of a database operation or any other database structure. Such MBO attributes are 'static' and are pre-defined when MBOs are created for the mobile application. However, this methodology does not enable the server to add new MBO attributes in a dynamic manner after the MBOs are initially created. In particular, the server is unable to add new MBO attributes between server-client synchronization sessions.

Accordingly, systems, methods and computer program products are needed that enable addition of MBO attributes in a dynamic manner.

BRIEF SUMMARY

Briefly stated, the invention includes system, method, computer program product embodiments and combinations and sub-combinations thereof for generating dynamic attribute elements and dynamic attributes for MBOs.

An embodiment includes generating dynamic attribute elements for MBO metadata in a manner that enables a mobile application to directly access and modify dynamic attributes included within the dynamic attribute elements. In an embodiment, dynamic attributes are included within the dynamic attribute elements arbitrarily to synchronization sessions of a server and a mobile application. The embodiment also allows the mobile application to set (or modify) a value associated with a dynamic attribute. Another embodiment includes embedding a dynamic attributes entity in generated client code and downloading dynamic MBO attributes and associated metadata when the client synchronizes with the server.

In this way, embodiments of the present invention enable a server to add dynamic MBO attributes and also enable a client to discover and modify the added dynamic attributes.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
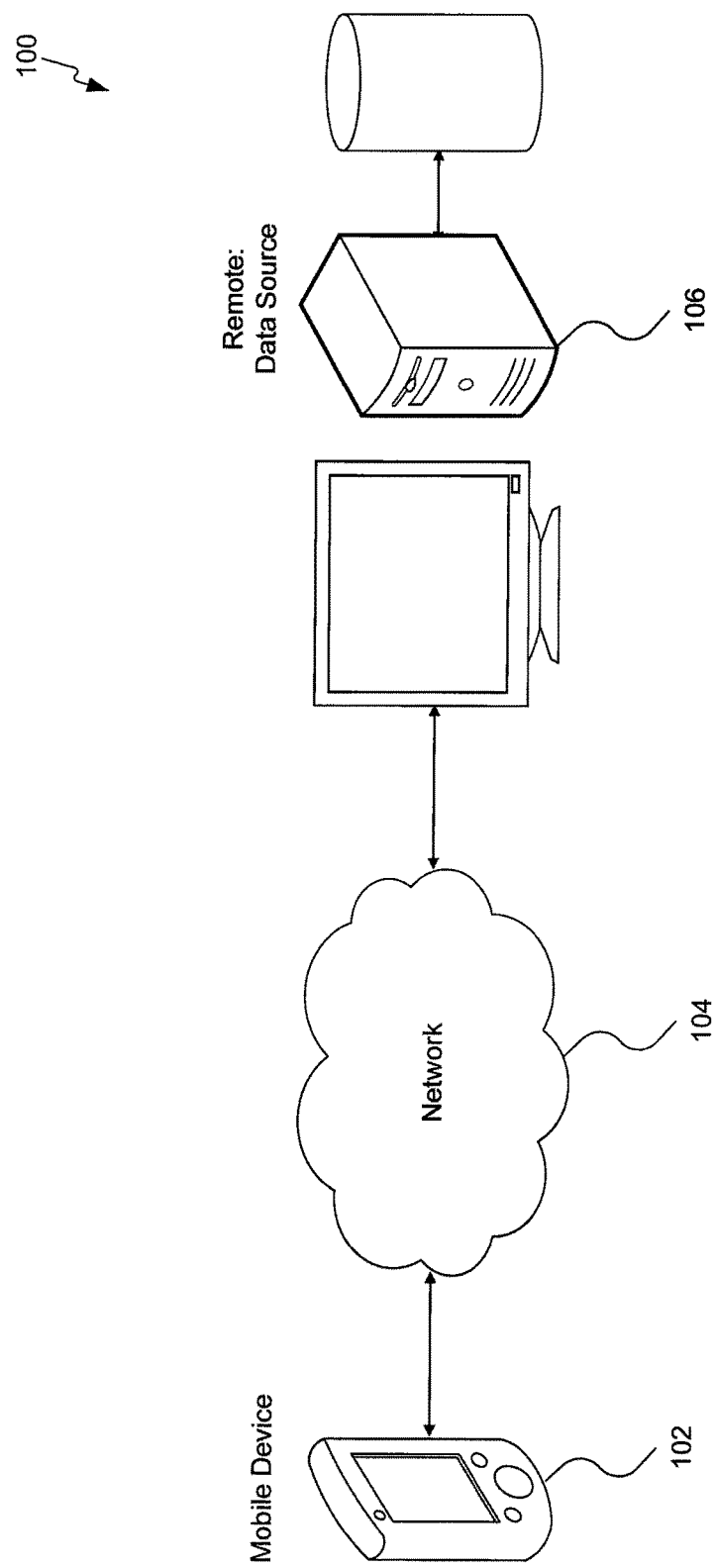
FIG. 1 is an example network architecture in which embodiments of the present invention, or portions thereof, are implemented.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible and intended, and fall within the scope and spirit of the present invention.

FIG. 1 is an example network architecture 100 in which embodiments of the present invention, or portions thereof, are implemented. Network architecture 100 includes a mobile device 102 connected over a network 104 to a server 106, in accordance with an embodiment of the present invention. In accordance with a further embodiment of the present invention, a developer writes a software application for deployment on mobile device 102. The software application is written to occasionally retrieve data from server 106. When the software application attempts to retrieve data from server 106, network 104 may or may not be available. One skilled in the relevant arts will appreciate that mobile device 102 may be any computing device connected over a network, such as network 104, to a server, and need not be a mobile device.

An exemplary system framework and MBOs are described in greater detail further below, with continuing reference to FIG. 1.

System Framework

Figure 2:
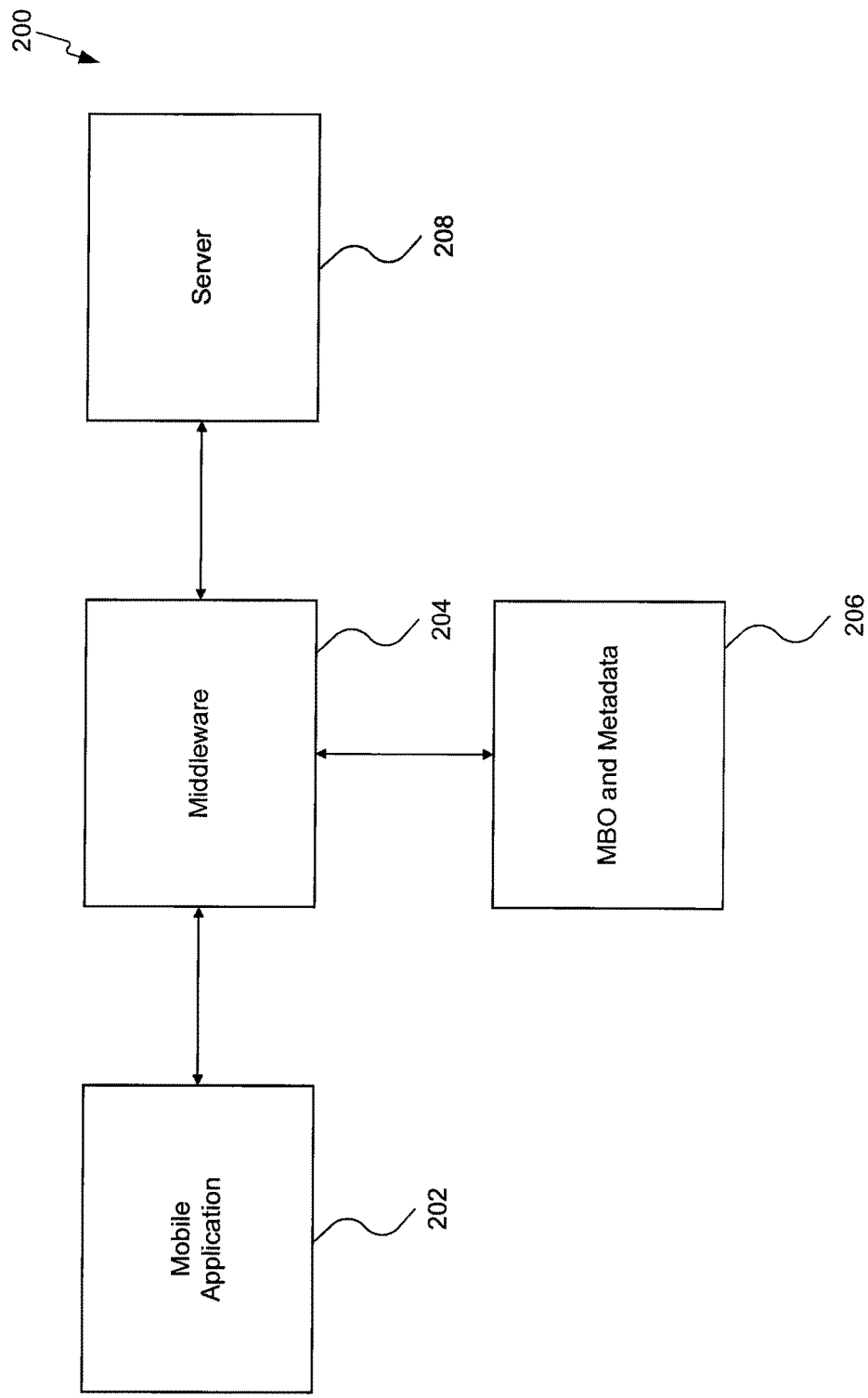
FIG. 2 is an example system framework, in accordance with an embodiment of the present invention.

FIG. 2 is an example system framework 200, in accordance with an embodiment of the present invention. Framework 200 defines a mobile application 202, middleware 204, a MBO 206 having associated metadata and data, and server 208, in accordance with an embodiment of the present invention. One skilled in the relevant arts will appreciate that the arrangement shown in framework 200 of FIG. 2 is presented by way of example, and not limitation. In accordance with an embodiment of the present invention, mobile application 202 is operable to run on mobile device 102 of FIG. 1. In accordance with a further embodiment of the present invention, server 208 is equivalent to the server 106 of FIG. 1.

Mobile application 202 accesses data in server 208 by making calls to an API or other interface of middleware 204, in accordance with an embodiment of the present invention. In accordance with an embodiment of the present invention, not intended to limit the invention, middleware 204 is the iAnywhere Mobilink middleware provided by Sybase, Inc. of Dublin, Calif. One skilled in the relevant arts will appreciate that server 208 may be any number of types of data sources, including, for example, a relational database or a remote procedure. Middleware 204 facilitates communications, through the use of its API, by an application to one or more data sources, such as server 208.

MBO 206 is a representation of a subset of data contained in server 208, in accordance with an embodiment of the present invention. In accordance with a further embodiment of the present invention, MBO 206 represents multiple data sources simultaneously (i.e., in an embodiment, MBO 206 comprises subsets of multiple data sources). MBO 206 is expressed using metadata, which is interpreted by the software of mobile application 202 to facilitate access of data from server 208 through middleware 204. Example MBOs are described in greater detail in U.S. patent application Ser. No. 12/503,573, filed on Jul. 15, 2009, entitled "Metadata Driven Mobile Business Objects," which is incorporated by reference herein in its entirety.

Dynamic MBO Attributes

As discussed earlier, MBO metadata includes attributes and parameters which can be mapped to enterprise information systems (EIS) columns, properties of a database operation or any other database structure. Such MBO attributes are 'static' and are pre-defined when MBOs are created for mobile application 202 by server 208. Mobile application 202 can access such static attributes and set values for the static attributes. However, this methodology does not enable server 208 to add new MBO attributes in a dynamic manner after the MBOs are initially created. In particular, server 208 is unable to add new MBO attributes between server-mobile application synchronization sessions. In contrast, embodiments of the present invention enable server 208 to add dynamic MBO attributes and also enable mobile application 202 to discover and modify the added dynamic attributes.

In an embodiment, server 208 embeds dynamic attribute elements within MBO 206. As an example, such dynamic attribute elements may be embedded by server 208 when MBO 206 is initially generated, or even after MBO 206 is generated for mobile application 202. Dynamic attribute elements can include one or more dynamic attributes.

Example 1A shown below illustrates exemplary attributes that can be embedded in MBO 206 by server 208. Example 1A includes both static attributes and dynamic attributes. Static attributes include 'id', 'email', 'firstName', 'lastName' and 'partner'. In an embodiment, server 208 embeds distinct dynamic attribute elements (also called delineators or markers herein), namely, '<dynamic-attributes>' and '</dynamic attributes>' and includes dynamic attributes within the embedded dynamic attribute elements.

In Example 1A shown below, "<attribute name="eyeColor" type="string"/>" references the attribute named "eyeColor" which is established as a dynamic attribute by being positioned within dynamic attribute elements '<dynamic-attributes>' and '</dynamic attributes>'. (Although in Example 1A, '<dynamic-attributes>' and '</dynamic attributes>' elements are used to include and identify dynamic attributes, it is to be appreciated that other elements or identifiers may be used to establish dynamic attributes.) The '<dynamic-attributes>' and '</dynamic attributes>' elements allow mobile application 202 (or any other client application) to discover or identify dynamic attributes. The discovery of dynamic attributes by mobile application 202 is described further below.

```
<entity name="Contact" key="id">
<allow-pending-state with-snapshot="true" />
<save-search-results />
<attribute name="id" type="string" guid="true" />
<attribute name="email" type="string" />
<attribute name="firstName" type="string" />
<attribute name="lastName" type="string" />
<attribute name="partner" type="Partner" foreign-key="partnerId" inverse="Partner.contacts" />
<dynamic-attributes>
<attribute name="eyeColor" type="string" />
</dynamic-attributes>
...
</entity>
```

Example 1A

```
<entity ...>
<dynamic-attributes>
</dynamic-attributes>
</entity>
```

Example 1B

Figure 3:
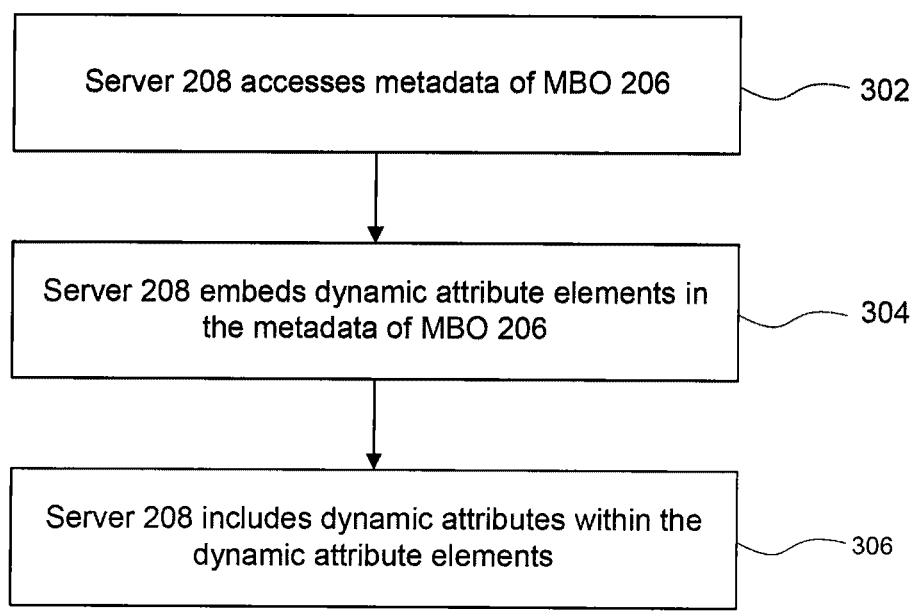
FIG. 3 is a flowchart illustrating exemplary embedding of dynamic attribute elements and inclusion of dynamic attributes within the embedded elements, according to an embodiment.

FIG. 3 is a flowchart illustrating exemplary embedding of dynamic attribute elements and inclusion of dynamic attributes within the embedded elements, according to an embodiment.

In step 302, server 208 accesses metadata of MBO 206. For example, metadata associated with MBO 206 can include MBO attributes and parameters which can be mapped to enterprise information systems (EIS) columns, properties of a database operation or any other database structure.

In step 304, server 208 embeds dynamic attribute elements (e.g. <dynamic-attributes> and </dynamic-attributes>) in the metadata accessed in step 302.

In step 306, server 208 includes dynamic MBO attributes within the dynamic attribute elements of step 304. It is to be appreciated that step 306 is optional, and that server 208 may create 'empty' dynamic attribute elements which can be populated with dynamic attributes at any time after the dynamic attribute elements have been embedded. For example, referring to Example 1B, server 208 may create 'empty' dynamic attribute elements (i.e. without dynamic attributes) which can be populated with dynamic attributes at any time after the dynamic attribute elements have been embedded.

In this way, server 208 embeds dynamic attribute elements within MBO metadata. Furthermore, the dynamic attribute elements may act as placeholders for dynamic MBO attributes, that may be added in the future by server 208, between synchronization sessions with mobile application 202.

Accessing Static and Dynamic MBO Attributes

As discussed earlier, MBO metadata includes attributes and parameters which can be mapped to enterprise information systems (EIS) columns, properties of a database operation or any other database structure. Such MBO attributes are 'static' and are pre-defined when MBOs are created by server 208 for mobile application 202.

In an embodiment, mobile application 202 can set values of static attributes in the attributes of MBO 206. In an embodiment, to set the values of static attributes, mobile application 202 uses a 'Get/Set' method which includes retrieving a static attribute and setting the value of the attribute. Referring to Example 2, shown below, mobile application 202 can first find MBO 'Customer c' and then set the 'Email' attribute of customer "c" to "a@b.c".

```
Customer c = Customer.find(...);
c.setEmail("a@b.c");
```

Example 2

Figure 4:
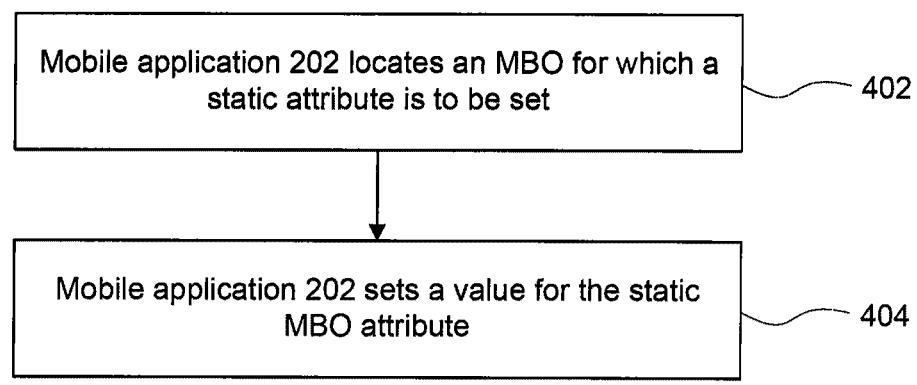
FIG. 4 is a flowchart illustrating manipulation of static attributes, according to an embodiment.

FIG. 4 is a flowchart illustrating exemplary manipulation of static attributes, according to an embodiment.

In step 402, mobile application 202 locates an MBO for which a static attribute is to be set. As an example, this is referred to as a 'Get' method. Referring to Example 2, shown above, mobile application 202 locates MBO 'Customer c'.

In step 404, mobile application 202 sets a value for a static attribute of the MBO retrieved in step 402. As an example of this is referred to as the 'Set' process. Referring to Example 2, mobile application 202 sets the value for the 'Email' attribute in MBO 'Customer c' to "a@b.c".

Referring to Example 3 shown below, line (1) illustrates the setting of static attribute "Name" in MBO "jane" to a value of "Jane". As discussed above, static attributes can be set using the 'Set' method (e.g. "setName").

In this way, mobile application 202 may set values for static attributes using a 'Get/Set' method, shown in Example 3.

```
Customer jane = new Customer( );                              (1)
jane.setName("Jane");
jane.getDynamicAttributes( ).add("eyeColor",                  (2)
com.sybase.reflection.DataValue.fromString("brown"));         (3)
String eyeColor = jane.getDynamicAttributes( ).item("eyeColor");
```

Example 3

In scenarios where names of dynamic attributes are known to mobile application 202, mobile application 202 can directly access and modify such dynamic attributes. In an embodiment, values of dynamic attributes are set in a manner different from static attributes. Referring to lines (2) and (3) in Example 3, the dynamic attributes in MBO "Jane" are retrieved and the dynamic attribute "eyeColor" is set to a value of "brown".

In this way, in an embodiment, mobile application 202 accesses dynamic attributes using, for example, the method "getDynamicAttributes( )", and then sets value(s) for accessed dynamic attributes.

Figure 5:
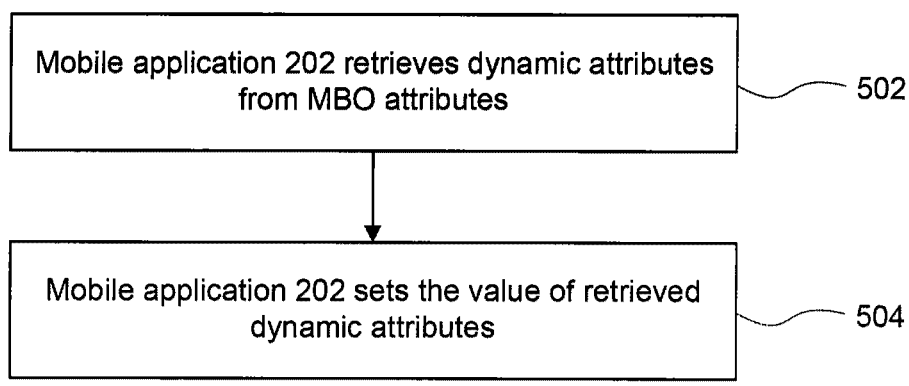
FIG. 5 is a flowchart illustrating manipulation of dynamic attributes, according to an embodiment.

FIG. 5 is a flowchart illustrating manipulation of dynamic attributes, according to an embodiment.

In step 502, mobile application 202 addresses and retrieves dynamic attributes from MBO attributes. Referring to Example 3, mobile application 202 directly addresses known dynamic attributes using the dynamic attribute name (e.g. "eyeColor").

In step 504, mobile application 204 sets the values of dynamic attributes retrieved in step 502. Referring to Example 3, mobile application 202 sets the value of the dynamic attribute "eyeColor" to "brown".

In this way, mobile application 202 accesses and modifies values for dynamic attributes when the name of a dynamic attribute is known to mobile application 202. However, dynamic attributes may be added to MBO metadata at anytime (e.g. between any two synchronization sessions) by server 208, as described above. In such a case, mobile application 202 may not know the name of the dynamic attribute in advance and will not be able to directly access the dynamic attribute. Therefore, in an embodiment, mobile application 202 first discovers any dynamic attributes that may have been added by server 208 between synchronization sessions. Discovery of dynamic attributes by mobile application 202 is described below.

Discovering Dynamic Attributes

As discussed above, Example 3 may apply to a scenario where mobile application 202 has advance knowledge of names of the dynamic attributes (e.g. "eyeColor"). However, embodiments of the invention also allow mobile application 202 to discover dynamic attributes by accessing metadata of MBO 206.

```
com.sybase.reflection.EntityMetaData emd =                    (1)
  Customer.getMetaData( );
for (com.sybase.reflection.AttributeMetaData amd :            (2)
  emd.getAttributes( ))
{
    if (amd.getIsDynamic( ))                                  (3)
    {
        com.sybase.reflection.DataValue dv =                  (4)
          myObject.item(amd.getName( ));
        String s = dv.toString( );
        ...
    }
}
```

Example 4

Referring to Example, 4 shown above, and particularly to line (1), the "Customer.getMetaData( )" command retrieves all metadata associated with the MBO "Customer". Line 2 and "AttributeMetaData amd:emd.getAttributes( )" retrieves all attributes (both static and dynamic) associated with the retrieved metadata. Once all attributes have been retrieved, mobile application 202 discovers or filters out the dynamic attributes from the retrieved attributes. For example, referring to line (3), mobile application 202 uses the command "if (amd.getIsDynamic( )" to discover dynamic attributes. As an example, the "if (amd.getIsDynamic( )" command may identify the dynamic attribute elements (e.g. '<dynamic-attributes>' and '</dynamic attributes>' elements) to discover dynamic attributes included within the dynamic attribute elements. Once dynamic attributes have been discovered (or identified), mobile application 202 may modify values associated with the dynamic attributes.

In this way, mobile application 202 accesses and modifies values for dynamic attributes when the name of the dynamic attributes are not previously known to mobile application 202.

Figure 6:
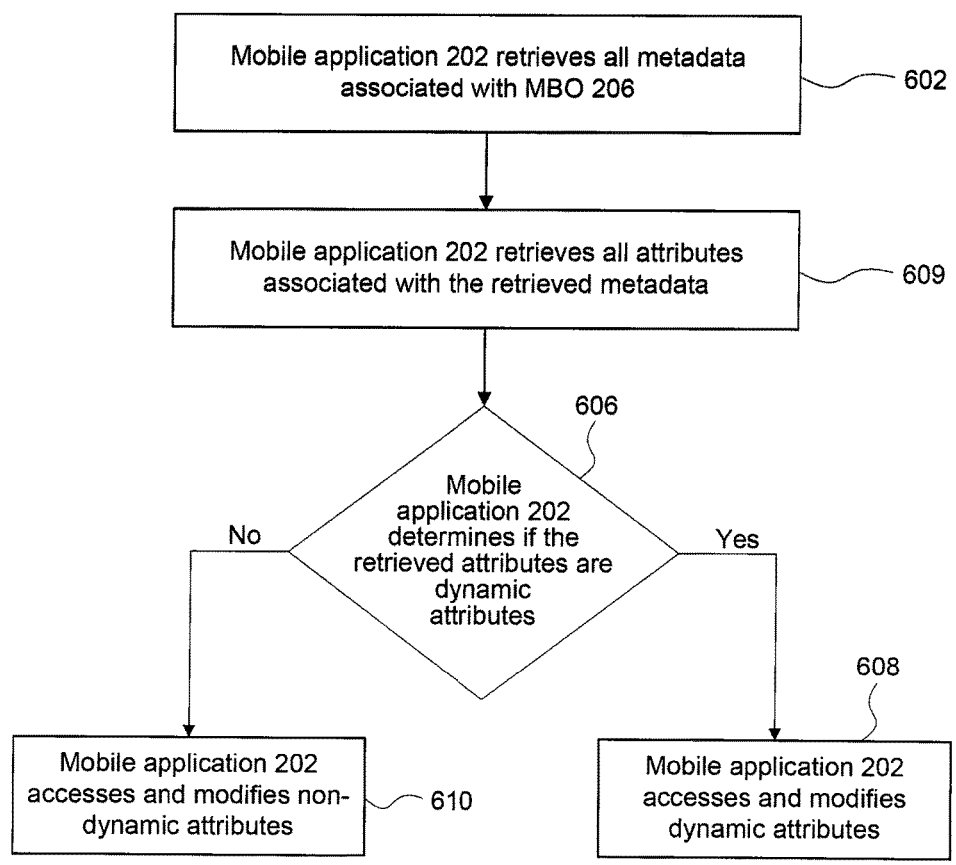
FIG. 6 is a flowchart illustrating discovery of dynamic attributes by a mobile application, according to an embodiment.

FIG. 6 is a flowchart illustrating an exemplary discovery of dynamic attributes by mobile application 202, according to an embodiment.

In step 602, mobile application 202 retrieves all metadata associated with an MBO (e.g. MBO 206). As discussed above, for example, the "Customer.getMetaData( )" command retrieves all metadata associated with the MBO "Customer".

In step 604, mobile application 202 retrieves all attributes (both static and dynamic) associated with the metadata retrieved in step 602. As an example, the command "AttributeMetaData amd:emd.getAttributes( )" retrieves all attributes (both static and dynamic) associated with the metadata.

In step 606, mobile application 202 determines if the attributes retrieved in step 604 are dynamic attributes. As an example, step 606 may determine if the retrieved attributes were embedded within dynamic attribute elements (e.g. '<dynamic-attributes>' and '</dynamic attributes>' elements) to determine if the retrieved attributes are dynamic attributes. If the attributes are dynamic (step 606), mobile application 202, proceeds to access the dynamic attribute elements and may modify values for the dynamic attributes (step 608). Returning to step 606, if mobile application 202 determines if the attributes retrieved in step 604 are not dynamic attributes, mobile application 202, proceeds to access non-dynamic attributes and may modify the values for the non-dynamic (static) attributes (step 610).

In an embodiment, not intended to limit the invention, providing dynamic access to meta-data is achieved by including a "DynamicAttributesMetaData" entity into the generated code for mobile application 202 by server 208, and arranging for the dynamic attribute metadata to be loaded from a package properties file. The properties file generated by server 208 is then downloaded from server 208 by mobile application 202 when mobile application 202 first synchronizes with server 208. Also, in an embodiment, the generated "getMetaData( )" method (shown in line (1) of Example 4) for each MBO merges the downloaded metadata, from the package properties file, with the non-dynamic (or static) meta-data.

Localization of Metadata

Localization is the process of adapting MBO metadata to the linguistic requirements of a user of mobile application 202. Conventional software localization is typically an activity performed after an application has been finalized and prior to delivery to a user. In contrast to conventional approaches, embodiments of the present invention enable server 208 to localize MBO metadata in real time based on a language personalization parameter provided by mobile application 202.

In an embodiment, if mobile application 202 provides a language personalization parameter to server 208, then meta-data is localized by server 208 before being downloaded by mobile application 202. As an example, such a language personalization parameter can be provided to server 208 by mobile application 202 when mobile application 202 synchronizes with server 208.

Thus for example, if MBO metadata at server 208 contains an embedded string "en::City;;de::Stadt;;fr::Ville" and if the mobile application 202's selected language personalization parameter is "fr", the metadata received by the mobile application 202 will contain the string "Ville" as "Ville" is associated with the selected language "fr" (or French).

Example 5 shown below illustrates an exemplary localization process, according to an embodiment. Referring to Example 5 shown below and particularly to line (1), first mobile application 202 determines if MBO metadata at server 208 includes an embedded string specifying localization parameters (e.g. "en::City;;de::Stadt;;fr::Ville"). Referring to line (2), if the MBO metadata at server 208 includes an embedded string specifying localization parameters, server 208 then localizes the metadata with language personalization parameter (e.g. "fr") provided by mobile application 202. In an embodiment, such a localization process can be performed by server 208 using the method "localize (jv, language)". Referring to line (3), after the localization of metadata by server 208 is complete, mobile application 202 updates the metadata with the localized value (e.g. using js.setValue(s)).

In this way, mobile application 202 can receive localized metadata based on a pre-selected language provided to server 208.

```
if (value instanceof JsonString)                    (1)
{
    JsonString js = (JsonString)value;
    String s = js.getValue( );
    if(name.equals("U"))
    {
        JsonObject jv =
        JsonValue.getObject(JsonReader.read(s));
        localize(jv, language);                     (2)
        s = jv.toString( );
        js.setValue(s);                             (3)
        continue;
    }....}
```

Example 5

Figure 7:
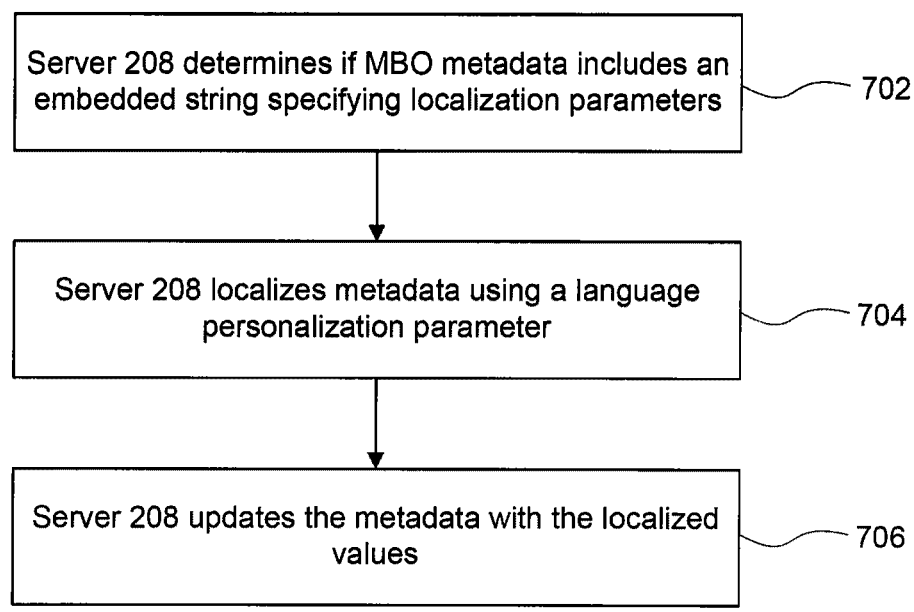
FIG. 7 is a flowchart illustrating localization of downloaded metadata, according to an embodiment.

FIG. 7 is a flowchart illustrating localization of downloaded metadata, according to an embodiment.

In step 702, server 208 determines if MBO metadata at server 208 includes an embedded string specifying localization parameters (e.g. "en::City;;de::Stadt;;fr::Ville").

In step 704, server 208 localizes the metadata using a language personalization parameter provided by mobile application 202 (e.g. "fr").

In step 706, server 208 updates the metadata with the localized value (e.g. using js.setValue(s)).

In this way, embodiments of the invention enable server 208 to localize MBO metadata in real time based on a language personalization parameter provided by mobile application 202.

Example Computer Embodiment

Figure 8:
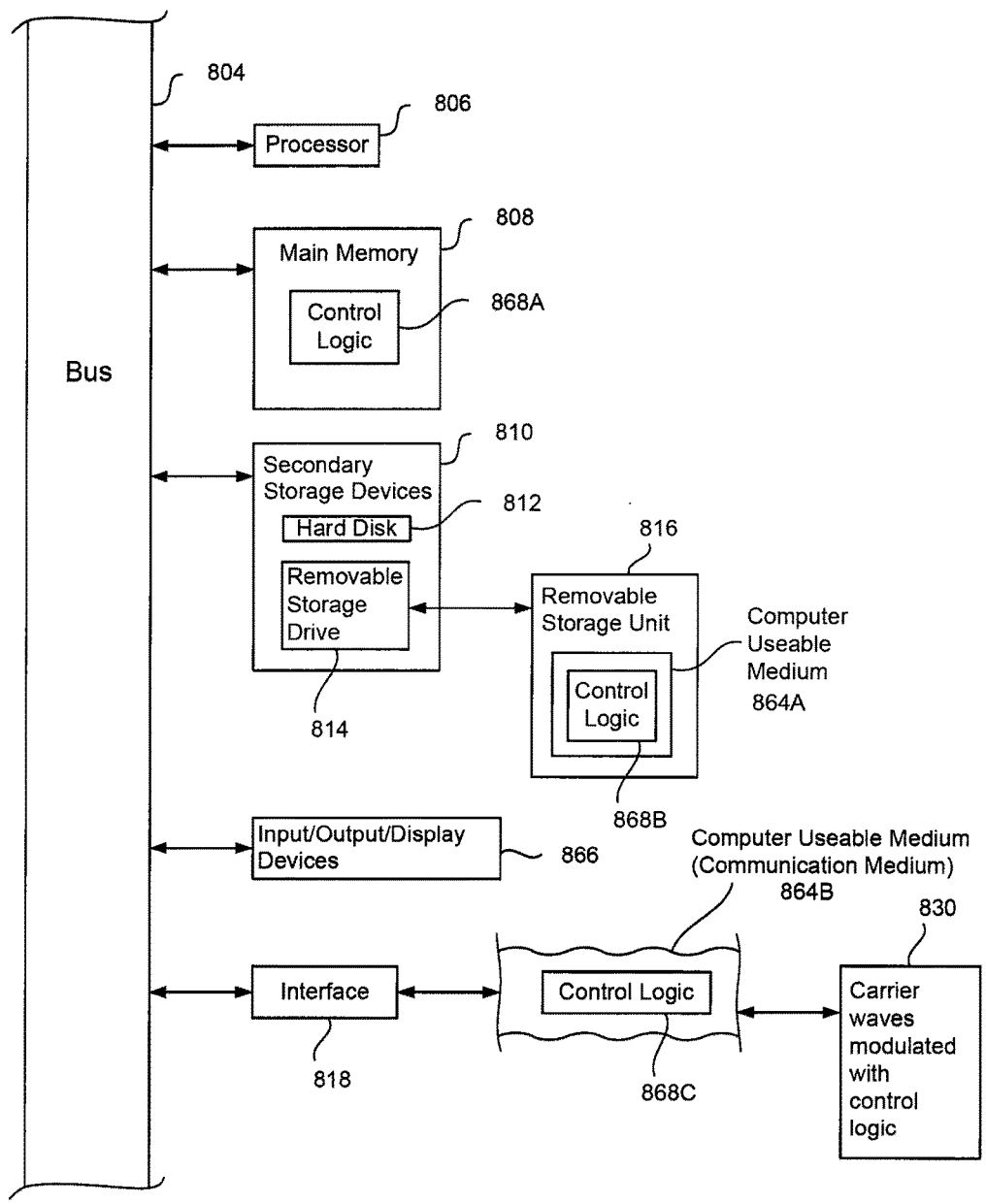
FIG. 8 depicts an example computer system in which embodiments of the present invention may be implemented.

In an embodiment of the present invention, the system and components of embodiments described herein are implemented using well known computers, such as computer 802 shown in FIG. 8. For example, server 208 or mobile device 102 can be implemented using computer(s) 802.

The computer 802 can be any commercially available and well known computer capable of performing the functions described herein, such as computers available from International Business Machines, Apple, Sun, HP, Dell, Compaq, Cray, etc.

The computer 802 includes one or more processors (also called central processing units, or CPUs), such as a processor 806. The processor 806 is connected to a communication bus 804.

The computer 802 also includes a main or primary memory 808, such as random access memory (RAM). The primary memory 808 has stored therein control logic 828A (computer software), and data.

The computer 802 also includes one or more secondary storage devices 810. The secondary storage devices 810 include, for example, a hard disk drive 812 and/or a removable storage device or drive 814, as well as other types of storage devices, such as memory cards and memory sticks. The removable storage drive 814 represents a floppy disk drive, a magnetic tape drive, a compact disk drive, an optical storage device, tape backup, etc.

The removable storage drive 814 interacts with a removable storage unit 816. The removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. The removable storage drive 814 reads from and/or writes to the removable storage unit 816 in a well known manner.

The computer 802 also includes input/output/display devices 822, such as monitors, keyboards, pointing devices, etc.

The computer 802 further includes a communication or network interface 818. The network interface 818 enables the computer 802 to communicate with remote devices. For example, the network interface 818 allows the computer 802 to communicate over communication networks or mediums 824B (representing a form of a computer useable or readable medium), such as LANs, WANs, the Internet, etc. The network interface 818 may interface with remote sites or networks via wired or wireless connections.

Control logic 828C may be transmitted to and from the computer 802 via the communication medium 824B. More particularly, the computer 802 may receive and transmit carrier waves (electromagnetic signals) modulated with control logic 830 via the communication medium 824B.

Any apparatus or manufacture comprising a computer useable or readable medium having control logic (software) stored therein is referred to herein as a computer program product or program storage device. This includes, but is not limited to, the computer 802, the main memory 808, secondary storage devices 810, the removable storage unit 816 and the carrier waves modulated with control logic 830. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for adding dynamic attributes to a mobile business object (MBO), comprising:
   determining that said MBO includes one or more static attributes that were defined at least when said MBO was generated;
   embedding, using a server, dynamic attribute elements in metadata of said MBO after said MBO was generated, wherein said dynamic attribute elements are configured to position one or more dynamic attributes within said metadata of said MBO, and wherein said MBO is a representation of a subset of data contained in a data source;
   receiving a localization parameter from a mobile device running a mobile application, wherein the localization parameter identifies a requirement of the mobile application running on the mobile device;
   localizing, in real-time, the existing metadata of the MBO based on a selection of one or more of the dynamic attribute elements corresponding to the localization parameter received from the mobile device; and
   adding, using said server, at least one of the one or more dynamic attributes associated with said dynamic attribute elements between synchronization sessions of a server and a mobile application, wherein said MBO is configured to enable said mobile application to discover the at least one dynamic attribute associated with said MBO by retrieving attributes associated with said MBO and determining that at least one of said retrieved attributes comprises said dynamic attribute, and
   wherein said MBO is configured to enable said mobile application to modify a value of said discovered dynamic attribute between synchronization sessions of said server and said mobile application.

2. The method of claim 1, wherein said MBO is further configured to enable said mobile application to modify said value of said dynamic attribute after it discovers said dynamic attribute.

3. The method of claim 2, wherein said MBI is further configured to enable said mobile application to modify said value of said dynamic attribute by:
   addressing said dynamic attribute using a dynamic attribute name, and
   setting a value of said addressed dynamic attribute.

4. The method of claim 1, wherein said MBO is further configured to enable said mobile application to:
   identify a first dynamic attribute element; and
   identify a second dynamic attribute element associated with said first dynamic attribute element,
   wherein said dynamic attribute is included within said first and said second dynamic attribute elements.

5. The method of claim 1, further comprising:
   localizing said metadata based on a language personalization parameter; and
   providing said localized metadata to said mobile application.

6. The method of claim 5, further comprising:
   identifying language personalized values associated with said language personalization parameter.

7. The method of claim 1, wherein said MBO is a representation of a subset of data contained in a plurality of data sources.

8. The method of claim 1, wherein the localizing comprises:
   determining that the dynamic attribute elements include at least two alternative dynamic attribute elements, including a first one of the dynamic attribute elements corresponding to a value of the received localization parameter, and a second one of the dynamic attribute elements corresponding to a value different from the received localization parameter;
   selecting the first dynamic attribute element; and
   inserting one or more values of the first dynamic attribute element in the existing metadata, wherein the metadata does not include the second dynamic attribute element.

9. The method of claim 1, wherein a name of at least one of the dynamic attributes is not provided to the mobile application prior to the adding.

10. An article of manufacture including a non-transitory computer-readable medium having instructions stored thereon that, if executed by a computing device, cause said computing device to perform operations comprising:
    determining that a mobile business object (MBO) includes one or more static attributes that were defined at least when said MBO was generated;
    embedding, using a server, dynamic attribute elements in metadata of said MBO after said MBO was generated
    embedding, using a server, dynamic attribute elements in said MBO after said MBO was generated, wherein said dynamic attribute elements are configured to position one or more dynamic attributes within said metadata of said MBO, wherein said modifying occurs between synchronization sessions of said server and said mobile application;
    receiving a localization parameter from a mobile device running a mobile application, wherein the localization parameter identifies a requirement of the mobile application running on the mobile device;
    localizing, in real-time, the existing metadata of the MBO based on a selection of one or more of the dynamic attribute elements corresponding to the localization parameter received from the mobile device; and
    adding, using said server, at least one of the one or more dynamic attributes associated with said dynamic attribute elements between synchronization sessions of a server and a mobile application;
    wherein said MBO is configured to enable a mobile application to discover a dynamic attribute associated with said MBO by retrieving attributes associated with said MBO and determining that at least one of said retrieved attributes comprises said dynamic attribute, and
    wherein said MBO is configured to enable said mobile application to modify a value of said discovered dynamic attribute between synchronization sessions of said server and said mobile application.

11. The article of manufacture of claim 10, wherein said MBO is further configured to enable said mobile application to modify said dynamic attribute included in said dynamic attribute elements after said discovering.

12. The article of manufacture of claim 11, wherein said MBO is further configured to enable said mobile application to modify said dynamic attributes by:
    addressing said dynamic attribute using a dynamic attribute name; and
    setting a value of said addressed dynamic attribute.

13. The article of manufacture of claim 10, wherein said MBO is further configured to enable said mobile application to:
    identify a first dynamic attribute element; and
    identify a second dynamic attribute element associated with said first dynamic attribute element,
    wherein said dynamic attribute is included within said first and said second dynamic attribute elements.

14. The article of manufacture of claim 10, wherein the operations further comprise:
    localizing said metadata based on a language personalization parameter; and
    providing said localized metadata to said mobile application.

15. The article of manufacture of claim 14, wherein the operations further comprise:
    identifying language personalized values associated with said language personalization parameter.

16. A computer-based system for adding dynamic attributes to a mobile business object (MBO), comprising:
    a server, comprising a processor and a memory, said server being configured to:
      determine that said MBO includes one or more static attributes that were defined at least when said MBO was generated
      embed dynamic attribute elements in metadata of said MBO after said MBO was generated, wherein said dynamic attribute elements are configured to position one or more dynamic attributes within said metadata of said MBO, wherein said MBO is a representation of a subset of data contained in a data source,
      receive a localization parameter from a mobile device running a mobile application, wherein the localization parameter identifies a requirement of the mobile application running on the mobile device,
      localize, in real-time, the existing metadata of the MBO based on a selection of one or more of the dynamic attribute elements corresponding to the localization parameter received from the mobile device, and add at least one of the one or more dynamic attributes associated with said dynamic attribute elements between synchronization sessions; and a communication interface configured to couple said server to a mobile device having a mobile application configured to:

discover a dynamic attribute associated with said MBO by retrieving attributes associated with said MBO and determining that at least one of said retrieved attributes comprises said dynamic attribute, and modify a value of said discovered dynamic attribute attributes, wherein said mobile application is configured to modify said discovered dynamic attribute between synchronization sessions of said server and said mobile application.

17. The computer-based system of claim 16, wherein said MBO is further configured to enable said mobile application to modify said dynamic attributes after it discovers said dynamic attribute.

18. The computer-based system of claim 17, wherein said MBO is further configured to enable said mobile application to modify a dynamic attribute by addressing said dynamic attribute using a dynamic attribute name and setting a value of the addressed dynamic attribute.

* * * * *